Patented June 24, 1930

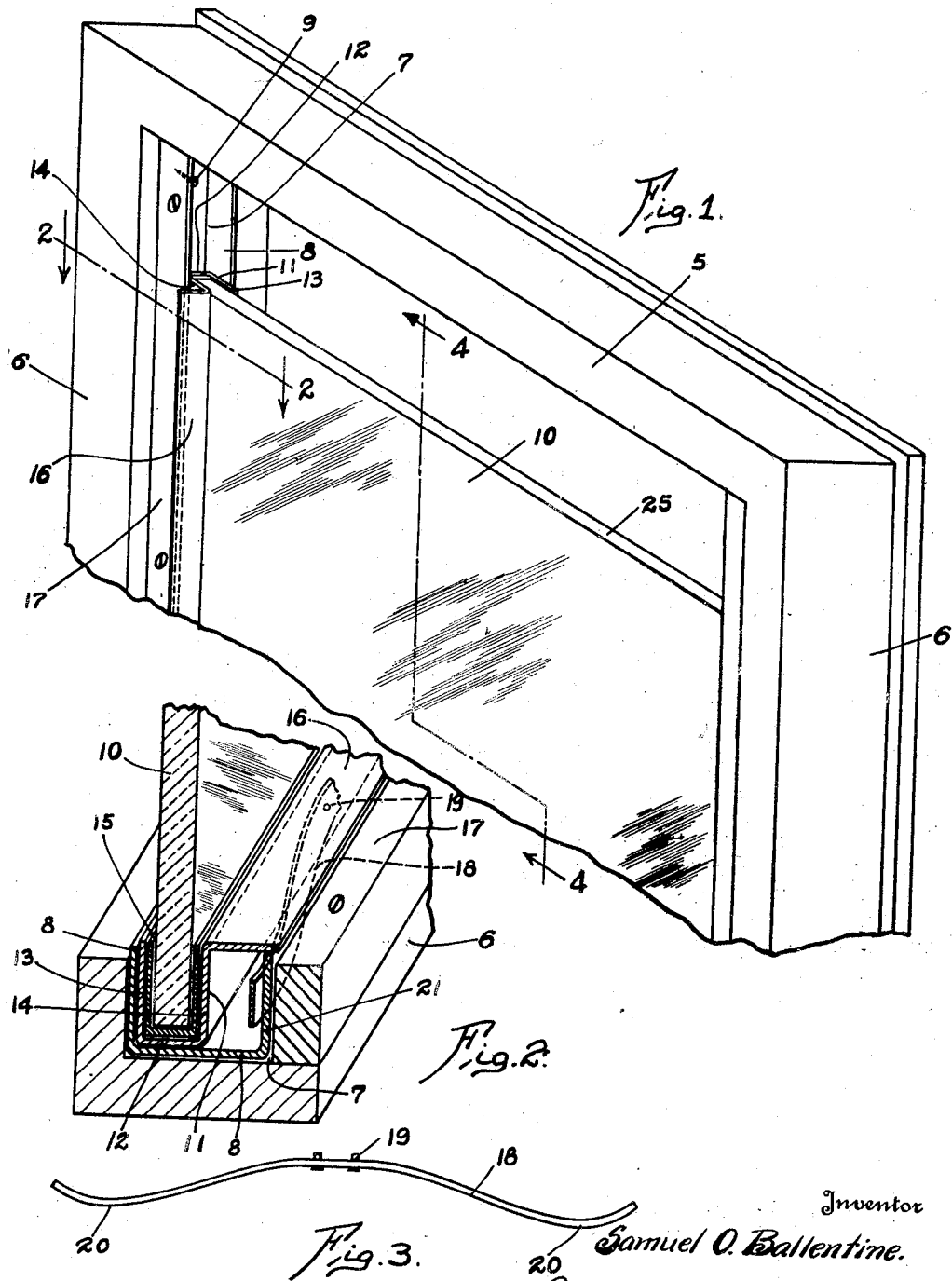

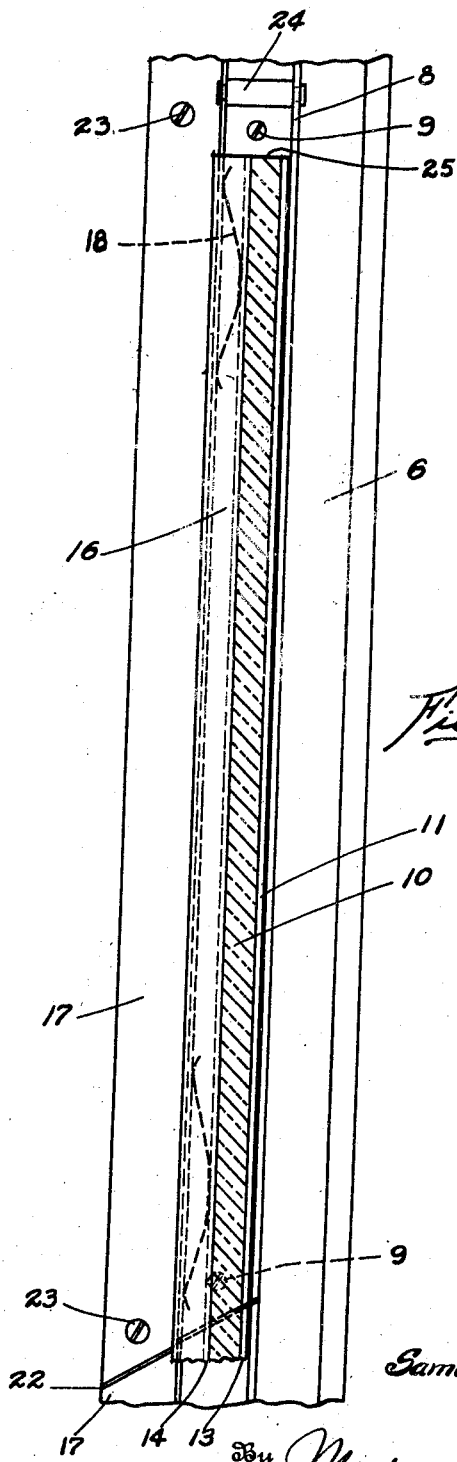

1,767,783

UNITED STATES PATENT OFFICE

SAMUEL O. BALLENTINE, OF GREENFIELD, OHIO

AUTOMOBILE WINDOW AND THE LIKE

Application filed May 18, 1928. Serial No. 278,874.

This invention relates to a window slide structure such as is used for automobile windows and the like and has for an object the provision of means whereby such windows may be effectively mounted in the desired slidable fashion but entirely free from the derogatory effects of vibration.

Another object is to provide a means of this kind that is adapted for inexpensive manufacture from formed sheet metal.

Another object is to provide a device of this kind which effectively protects the sliding glass in an automobile door from breakage due to the slamming of the door.

Another object is to provide a construction whereby the windows of an automobile may be assembled or removed in a simple, expeditious manner.

These and other objects are attained by the means described herein and disclosed in the accompanying drawings, in which:

Fig. 1 is a fragmental perspective view of an automobile door having a window slidably mounted thereby by means of the structure of the invention.

Fig. 2 is a fragmental perspective view of a section of the structure taken on line 2—2 of Fig. 1.

Fig. 3 is a side view of a spring forming a detail of the invention.

Fig. 4 is a view taken on line 4—4 of Fig. 1.

An automobile door 5 has upright side members 6 provided with channels 7. Within the channels 7 are U-shaped metal members 8 which may be secured by any suitable means such as nails or screws 9. The window glass 10 has attached along each of its longitudinal vertical edges a metal binder indicated generally as 11 and comprising a base 12 and arms 13 and 14 spaced from one another at a distance slightly in excess of the thickness of the glass. An adhesive member 15 is interposed between the sides and edge of the glass and the base and arms of the binder 11. The arm 14 has a flange 16 extending at right angles thereto and is adapted to ride over the removable molding strip 17 on the frame 6. One or more curved flat springs 18 are adapted to be secured on the outer face of arm 14, in any suitable fashion, as by rivets 19 so that the curved faces 20 adjacent opposite ends of said spring may abut the inner face of the arm 21 of the U-shaped metal channel 7.

From the foregoing it will be apparent that the mounting provides metal to metal bearing throughout and that such mounting is sufficiently resilient to yield under extreme lateral impact against the frame under which conditions the spring or springs 18 absorb the shock and immediately position the parts in operative relation. The flange 16 covers a space between the arm 21 of channel 7 and the arm 14 of the binder 11. Such closure precludes inadvertent insertion of the fingers or other objects between the window and its receiving channel. It should be noted that the material 15 may be any suitable adhesive substance and by preference will take the form of fabric impregnated with substance adapted for adhesion to metal and glass. Attention is furthermore directed to the fact that the binding of the glass and fabric between the arms 13 and 14 is practically sufficient to avoid relative displacement of the binder and glass, but by providing an adhesive substance the attachment is made more secure. The particular means for raising and lowering the glass or window forms no part of this invention and any approved structure for the purpose may be incorporated in the finished door or product.

The disclosure in Fig. 4 represents a structure common to both vertical frames 6 of a door or other body structure. The removable molding 17, and U-shaped metal member 8 are each severed on the bias as at 22 closely adjacent to the end of the glass 10. The window may be lowered and screws 9 removed, then the window is raised and screws 23 are removed from the upper section of molding 17 whereupon the molding 17 may be removed and the glass 10 with its metal binder and a section of the opposed U-shaped metal members 8 are removed as a unit.

The fitting of windows in doors and bodies is rendered easy because of the simple structure just referred to. Stops 24 of suitable material may be mounted between the opposed arms of members 8 at the opposite limits of movement of the glass 10.

In addition to providing a strong and easily assembled construction it should be noted that the glass 10 need have only its top edge 25 ground and polished, since the side edges are bound in metal binders and the bottom edge is always concealed.

What is claimed is:

1. In a device of the class described the combination of a U-shaped metal channel adapted for mounting in a frame, a U-shaped metal binder adapted to loosely slide in said channel, a spring means mounted on said binder abutting an inner wall of the channel whereby to yieldingly retain the binder in the channel and a flange on the binder overhanging an edge of the channel and closing the space between the binder and channel.

2. In a device of the class described the combination of a U-shaped metal channel adapted for mounting in a frame, a U-shaped metal binder adapted to loosely slide in said channel, a spring means mounted on said binder abutting an inner wall of the channel whereby to yieldably retain the binder in the channel, a flange on the binder overhanging an edge of the channel and closing the space between the binder and channel, the binder comprising a pair of spaced arms, and a glass having its edges received between the arms of the binder and adhesively secured therein.

3. In an automobile door structure the combination of a pair of spaced flat members having grooves therein, opposed metal U-shaped channels fixed in said grooves, a glass, a metal binding on each of the opposed edges of the glass and adapted for slidable movement in said metal channels, said binding being adapted to fit loosely in the channels, resilient means carried by the binding elements for retaining said elements in sliding engagement with the channels and means on the binding elements to close the free space in the channels.

4. In an automobile door structure, a pair of opposed frames, removable molding on said frames, a pair of metal channels secured to the frames and retained against removal by the molding, and a metal bound glass slidably and yieldably mounted in the channels, said channels and molding being severed on a biased line intermediate the ends, to permit removal of the glass and part of its slidable mounting channel as a unit.

5. In an automobile window mounting the combination of a pair of spaced fixed metal channel members, a glass, a metal binding mounted on opposed edges of the glass and slidable in said elements, resilient means to retain the binding in sliding engagement with one side of each channel and a flange on each binding member riding over an edge of the channel for closing the space wherein the resilient means is disposed and for concealing the resilient means.

In testimony whereof, I have hereunto subscribed my name this 11th day of May, 1928.

SAMUEL O. BALLENTINE.